(12) United States Patent
Bono

(10) Patent No.: US 9,430,480 B1
(45) Date of Patent: Aug. 30, 2016

(54) ACTIVE-ACTIVE METRO-CLUSTER SCALE-OUT FOR UNIFIED DATA PATH ARCHITECTURE

(71) Applicant: EMC Corporation, Hopkinton, MA (US)

(72) Inventor: Jean-Pierre Bono, Westborough, MA (US)

(73) Assignee: EMC Corporation, Hopkinton, MA (US)

( * ) Notice: Subject to any disclaimer, the term of this patent is extended or adjusted under 35 U.S.C. 154(b) by 255 days.

(21) Appl. No.: 14/145,351

(22) Filed: Dec. 31, 2013

(51) Int. Cl.
*G06F 17/30* (2006.01)

(52) U.S. Cl.
CPC ............................. *G06F 17/30067* (2013.01)

(58) Field of Classification Search
CPC .... G06F 3/067; G06F 3/0665; G06F 3/0689; G06F 3/0631; G06F 3/0604; G06F 2009/45579; G06F 2201/815; G06F 3/061
See application file for complete search history.

(56) References Cited

U.S. PATENT DOCUMENTS

| | | |
|---|---|---|
| 7,254,685 B1 | 8/2007 | Cardente |
| 7,631,155 B1 | 12/2009 | Bono et al. |
| 7,698,334 B2 * | 4/2010 | Kazar ................... G06F 3/0611 |
| | | 707/737 |
| 7,849,263 B1 | 12/2010 | French |
| 8,285,758 B1 | 10/2012 | Bono et al. |
| 8,429,307 B1 | 4/2013 | Faibish et al. |
| 8,433,869 B1 | 4/2013 | Natanzon et al. |
| 8,566,371 B1 | 10/2013 | Bono et al. |
| 8,645,654 B1 | 2/2014 | Bailey et al. |
| 8,782,324 B1 | 7/2014 | Chen et al. |
| 8,892,818 B1 * | 11/2014 | Zheng ............... G06F 17/30327 |
| | | 711/114 |
| 9,069,783 B1 * | 6/2015 | Bono ...................... G06F 3/061 |
| | | 707/999.01 |
| 2004/0030668 A1 | 2/2004 | Pawlowski et al. |
| 2006/0195715 A1 | 8/2006 | Herington |
| 2009/0106255 A1 * | 4/2009 | Lacapra .............. G06F 11/1076 |
| | | 707/999.01 |
| 2010/0042792 A1 * | 2/2010 | Sandler ............... G06F 11/2076 |
| | | 711/162 |
| 2014/0282539 A1 * | 9/2014 | Sonnek ............... G06F 9/45558 |
| | | 718/1 |

OTHER PUBLICATIONS

Bono, "Unified Datapath Architecture," U.S. Appl. No. 13/828,322, filed Mar. 14, 2013.
EMC Corporation, "Array-Based Replication with EMC VPLEX," (http://www.emc.com/collateral/hardware/white-papers/h8005-array-based-replication-vplex-wp.pdf) Aug. 2010.
EMC Corporation, Technical Marketing Documentation VMware vSphere Metro Storage Cluster Case Study, VMware vSphere 5.0, V 1.0 May 2012.

* cited by examiner

*Primary Examiner* — Yuk Ting Choi
(74) *Attorney, Agent, or Firm* — BainwoodHuang

(57) ABSTRACT

A technique for providing active-active access to pooled block-based objects and pooled file-based objects by multiple storage processors over distance in a metro-cluster includes virtualizing locally attached LUNs and making the virtualized LUNs available to all the storage processors in the metro-cluster. Storage pools and internal file systems operate on each of the storage processors and coordinate with one another to maintain consistent storage allocation and a consistent file system image across all storage processors in the metro-cluster. The resulting arrangement allows storage processors in the metro-cluster to access both block-based data objects and file-based data objects in an active-active manner, while maintaining consistency across all storage processors and allowing customers to benefit from the advantages of pooled data objects.

20 Claims, 7 Drawing Sheets

ACTIVE-ACTIVE METRO-CLUSTER SCALE-OUT FOR UNIFIED DATA PATH ARCHITECTURE

BACKGROUND

Data storage systems are arrangements of hardware and software that include storage processors coupled to arrays of non-volatile storage devices. In typical operation, the storage processors service IO (Input/Output) requests that arrive from hosts. The IO requests specify files or other data elements (e.g., block-based data) to be written, read, created, or deleted, for example. The storage processors each run software that manages incoming storage requests and perform various data processing operations to organize and secure user data stored on the non-volatile storage devices.

Storage processors commonly operate in one of two modes: active-passive or active-active. In active-passive mode, one storage processor ("SP") of a data storage system operates as an active SP and handles data processing tasks associated with servicing IO requests directed to a particular data object. Other SPs of the data storage system operate in passive mode. Such other SPs may receive IO requests directed to the data object but do not process them. Rather, the other SPs forward the IO requests to the active SP, which processes the IO requests to effect data operations on the data object, such as reading and writing. In active-active mode, by contrast, multiple SPs of a data storage system can process IO requests to effect data operations on the same data object. No forwarding of IO requests is required, and multiple SPs can perform operations on the same data object at the same time.

Some conventional data storage systems include data federation equipment for providing location-independence of LUNs (logical unit numbers—although the acronym also describes the storage units themselves), cache coherency, and data mirroring between different sites in a metro-cluster. A well-known example of data federation equipment is the VPLEX family of systems available from EMC Corporation of Hopkinton, Mass. Conventional data storage systems have employed VPLEX systems in block-based active-passive arrangements stretched across distance to provide data mirroring to a remote site and failover in the event of a local site failure.

SUMMARY

Active-active arrangements provide advantages over active-passive ones in terms of both performance and ease of management. Performance of active-active arrangements tends to be higher because such arrangements benefit from parallel processing among multiple SPs. Also, storage management in active-active arrangements tends to be easier because administrators do not have to consider whether SPs are active or passive when configuring, deploying, and maintaining a data storage system, as all SPs in an active-active arrangement generally have the same capabilities.

Unfortunately, however, conventional data storage systems allow active-active operation in very limited circumstances, such as when accessing fixed-sized LUNs at a single site. These conventional techniques provide no active-active solution for pooled LUNs or file systems, nor do they provide active-active operation over distance, such as in a metro-cluster.

Efforts are underway to develop data storage systems having IO stacks with unified data paths for providing access to both block-based objects (e.g., LUNs and block based vVOLs—virtual volumes) and file-based objects (e.g., file systems and file-based vVOLs). Such IO stacks internally realize both block-based objects and file-based objects in the form of files, which belong to a set of internal file systems built upon a storage pool. It would be desirable to leverage the unified data path to provide active-active access to data objects in a metro-cluster.

In contrast with prior systems, an improved technique provides active-active access to pooled block-based objects and pooled file-based objects by multiple storage processors over distance in a metro-cluster. The storage processors in the metro-cluster virtualize locally attached LUNs and make the virtualized LUNs available to all the storage processors in the metro-cluster. A storage pool runs on each of the storage processors and provisions storage units derived from the virtualized LUNs for use in composing data objects. On each storage processor, data objects are realized in the form of respective files stored in a set of internal file systems, which are built upon volumes composed from storage units from the storage pool. To provide active-active access to a data object, the internal file system for that data object on each of the storage processors is clustered and made to coordinate with the internal file system for that object on each of the other storage processors to present a consistent file system image having a single namespace across all storage processors. In a similar manner, the storage pool on each of the storage processors is clustered and coordinates with a storage pool on each of the other storage processors to present a consistent image of storage unit allocation across all storage processors. The resulting arrangement allows each storage processor in the metro-cluster to access both block-based data objects and file-based data objects over distance in an active-active manner, while maintaining consistency across all storage processors and allowing customers to benefit from the advantages of pooled data objects.

Certain embodiments are directed to a method of processing IO requests in a data storage metro-cluster. The method includes virtualizing a set of LUNs (logical unit numbers) to make the LUNs accessible by any of multiple storage processors within the data storage metro-cluster. The method further includes operating, on each of the storage processors, a clustered storage pool, the clustered storage pool deriving storage units from the set of virtualized LUNs for provisioning units of storage to data objects and maintaining consistency with the clustered storage pool on each of the other storage processors such that changes to a clustered storage pool on one storage processor are reflected in the clustered storage pools of all storage processors. The method further includes operating, on each of the storage processors, a clustered file system presenting a single namespace shared among the storage processors. The clustered file system is provisioned from storage units of the clustered storage pool and stores a data object realized in a form of a file of the clustered file system. In addition, the method still further includes, in response to receiving IO requests, providing read and write access to the data object by the storage processors of the metro-cluster in an active-active arrangement.

Other embodiments are directed to a data storage system constructed and arranged to perform the method described above. Still other embodiments are directed to a computer program product. The computer program product stores instructions, which when executed by control circuitry of a data storage system, cause the control circuitry to perform the method described above. Some embodiments involve activity that is performed at a single location, while other embodiments involve activity that is distributed over a computerized environment (e.g., over a network).

BRIEF DESCRIPTION OF THE SEVERAL
VIEWS OF THE DRAWINGS

The foregoing and other features and advantages will be apparent from the following description of particular embodiments of the invention, as illustrated in the accompanying drawings, in which like reference characters refer to the same parts throughout the different views. In the accompanying drawings, FIG. 1 is a block diagram showing an example environment in which improved techniques hereof may be practiced, wherein a data storage system includes a pair of storage processors that operate in an active-active arrangement;

DETAILED DESCRIPTION OF THE
INVENTION

Embodiments of the invention will now be described. It is understood that such embodiments are provided by way of example to illustrate various features and principles of the invention, and that the invention hereof is broader than the specific example embodiments disclosed.

An improved technique provides active-active access to both pooled block-based data objects and pooled file-based data objects from multiple storage processors of a data storage system.

To assist the reader, this specification is presented in two sections. Section I presents an example arrangement in which active-active access to data objects is provided from two or more storage processors of a data storage system. Section II presents an example arrangement in which active-active access to data objects is extended geographically to apply across multiple storage processors in a metro-cluster. Section I: Example Active-Active Access from Two or More Storage Processors of a Data Storage System.

Figure 1:
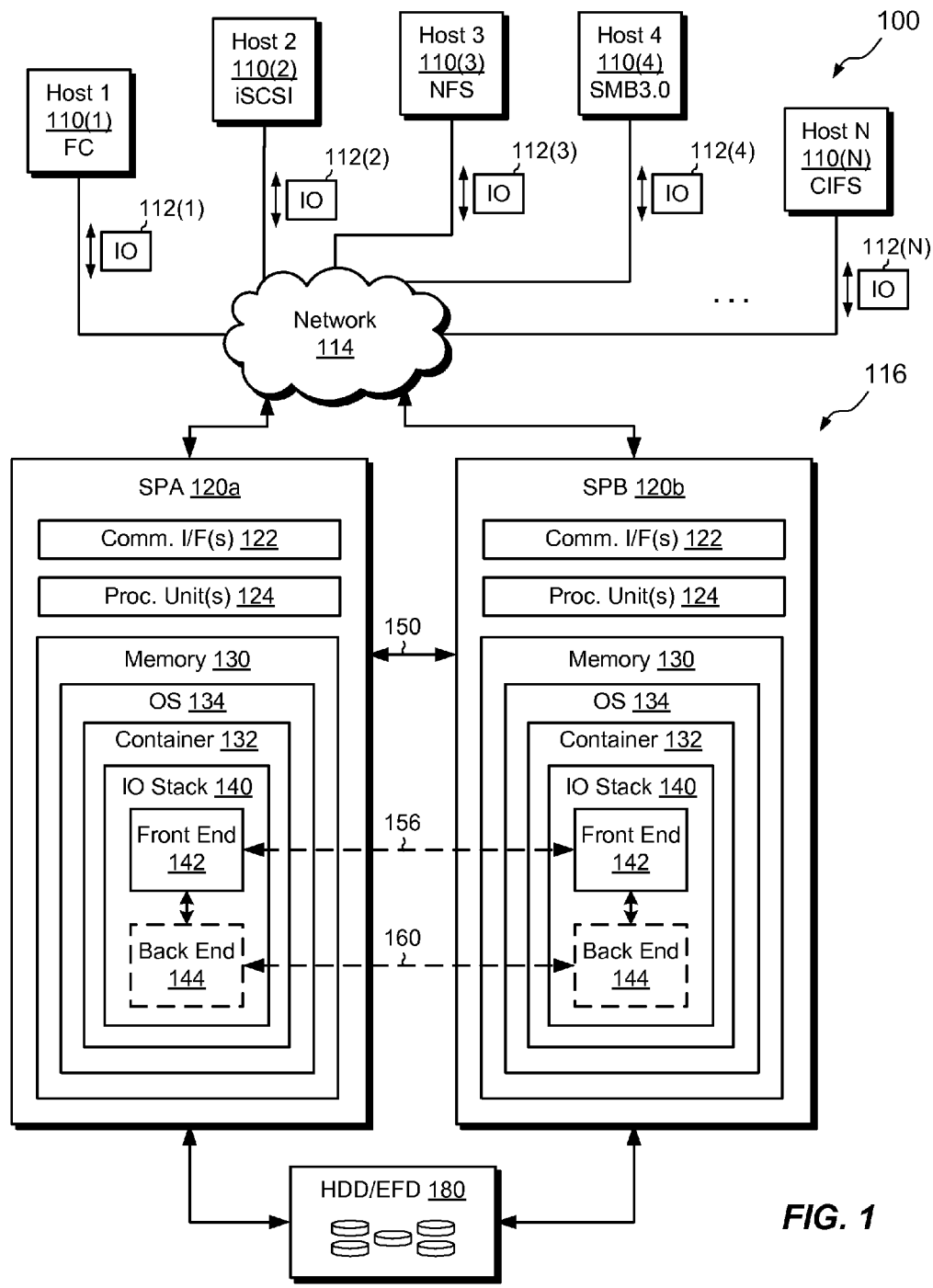

FIG. 1 shows an example environment 100 in which active-active access from two or more storage processors of a data storage system can be practiced. Here, multiple host computing devices ("hosts"), shown as devices 110(1) through 110(N), access a data storage system 116 over a network 114. The data storage system 116 includes a first storage processor ("SPA") 120a, a second storage processor ("SPB") 120b, and storage 180. The storage 180 is provided, for example, in the form of hard disk drives and/or electronic flash drives. In an example, such drives are dual-ported to provide fault tolerance and to better support active-active access from multiple sources. In an example, the SPs 120a and 120b are provided as circuit board assemblies, or "blades," which plug into a chassis that encloses and cools the SPs. The chassis has a backplane for interconnecting the SPs, and additional connections may be made among SPs using cables. For instance, cable 150 provides a high-speed interconnect between SP 120a and SP 120b, using CMI or PCI Express, for example. It is understood that no particular hardware configuration is required, however, as any number of SPs can be provided and the SPs can be any type of computing device capable of processing host IOs.

The network 114 can be any type of network or combination of networks, such as a storage area network (SAN), local area network (LAN), wide area network (WAN), the Internet, and/or some other type of network, for example. In an example, the hosts 110(1-N) connect to the SP 120 using various technologies. For example, the host 110(1) connect to the SP 120 using Fibre Channel (e.g., through a SAN). The hosts 110(2-N) connect to the SP 120 using TCP/IP, to support, for example, iSCSI, NFS, SMB 3.0, and CIFS. Any number of hosts 110(1-N) may be provided, using any of the above protocols, some subset thereof, or other protocols besides those shown. As is known, Fibre Channel and iSCSI are block-based protocols, whereas NFS, SMB 3.0, and CIFS are file-based protocols. In an example, each of the SPs 120a and 120b is configured to receive IO requests 112(1-N) according to both block-based and file-based protocols and to respond to such IO requests 112(1-N) by reading or writing the storage 180 in an active-active mode.

The SPs 120a and 120b may be similarly configured. Each of the SPs 120a and 120b is seen to include one or more communication interfaces 122, a set of processing units 124, and memory 130. The communication interfaces 122 include, for example, adapters, such as SCSI target adapters and network interface adapters, for converting electronic and/or optical signals received from the network 114 to electronic form for use by the respective SP. The set of processing units 124 include one or more processing chips and/or assemblies. In a particular example, the set of processing units 124 includes numerous multi-core CPUs. The memory 130 includes both volatile memory (e.g., RAM), and non-volatile memory, such as one or more ROMs, disk drives, solid state drives, and the like. The set of processing units 124 and the memory 130 together form control circuitry, which is constructed and arranged to carry out various methods and functions as described herein. Also, the memory 130 includes a variety of software constructs realized in the form of executable instructions. When the executable instructions are run by the set of processing units 124, the set of processing units 124 are caused to carry out the operations of the software constructs. Although certain software constructs are specifically shown and described, it is understood that the memory 130 typically includes many other software constructs, which are not shown, such as various applications, processes, and daemons.

As shown, the memory 130 includes an operating system 134, such as Unix, Linux, or Windows™, for example. The memory 130 further includes a container 132. In an example, the container 132 is a software process that provides an isolated userspace execution context within the operating system 134. In various examples, the memory 130 may include multiple containers like the container 132, with each container providing its own isolated userspace instance. Although containers provide isolated environments that do not directly interact (and thus promote fault containment), different containers can run on the same kernel (not shown) and can communicate with one another using inter-process communication (IPC) mediated by the kernel. Containers are well-known features of Unix, Linux, and other operating systems.

In the example of FIG. 1, each of the SPs 120a and 120b is seen to include only a single container 132. An IO stack 140 running within the container 132 on each of the SPs 120a and 120b provides an execution path for host IOs (e.g., IO requests 112(1-N)). The IO stack 140 includes a front end 142 and a back end 144. In alternative arrangements, the back end 144 is located on another SP (e.g., in a modular arrangement) or is provided in a block-based array connected to the SPs 120a and 120b (e.g., in a gateway arrangement).

In an example, the storage 180 stores data blocks that make up data objects, such as LUNs, host file systems, vVOLs, VMDKs, VHDs, and so forth. The back end 144 on each of the SPs 120a and 120b performs, inter alia, caching and RAID operations to support active-active operation. Coordination among back ends 144 is achieved by communicating among back ends 144 of the SPs 120a and 120b (e.g., via logical path 160) to maintain cache coherency and coherency in RAID operations and thus to ensure that the back ends 144 operate together in a consistent manner. The front end 142 on each of the storage processors 120a and 120b performs, inter alia, caching, pooling, file system, and mapping operations to support active-active operation. Coordination among front ends 142 is achieved by communicating among front ends 142 of the SPs 120a and 120b (e.g., via logical path 156) to ensure that the front ends 142 operate together in a consistent manner. Physical communication over the logical paths 156 and 160 may take place over the interconnect 150 or through some other means, such as over a backplane, over the network 114, and/or over some other network.

In operation, the hosts 110(1-N) issue IO requests 112(1-N) to the data storage apparatus 116. The IO requests 112(1-N) may include both block-based requests and file-based requests. The SPs 120a and 120b each receive the IO requests 112(1-N) (or some subset of them) at the communication interfaces 122 and pass the IO requests to the respective IO stack 140 for further processing. At the front end 142, processing may include mapping IO requests directed to LUNs, host file systems, vVOLs, VMDKs (virtual memory disks), and other data objects to respective files stored in a set of internal file systems of the data storage system 116. Host IO requests for reading and writing block-based objects and file-based objects are thus converted to reads and writes of respective files. After processing by the front end 142 of each SP, the IO requests propagate to the back end 144 of the respective SP, where the back end 144 executes commands for reading and/or writing the storage 180, agnostically to whether the data read and/or written is directed to a block-based object or a file-based object.

SPs 120a and 120b can process IO requests directed to data objects in an active-active manner. For example, each of the SPs 120a and 120b may receive and process read and write operations directed to the same data object at the same time. Neither of the SPs 120a and 120b is the exclusive owner of the data object; rather, both SPs 120a and 120b have access to the data object and have the ability to perform data processing activities to service IO requests directed to the data object. Performance in this active-active arrangement is generally better than performance in active-passive schemes, which require a single SP to perform all data processing for a particular data object. Here, however, both SPs 120a and 120b may operate in parallel to process IO requests directed to the same data object. Also, administrators benefit because they need not have to consider whether an SP is active and therefore optimized for use, or whether the SP is passive, and therefore not optimized for use (as IO requests must be forwarded). Configuration, deployment, and maintenance of data storage systems employing this active-active arrangement are therefore simplified.

Figure 2:
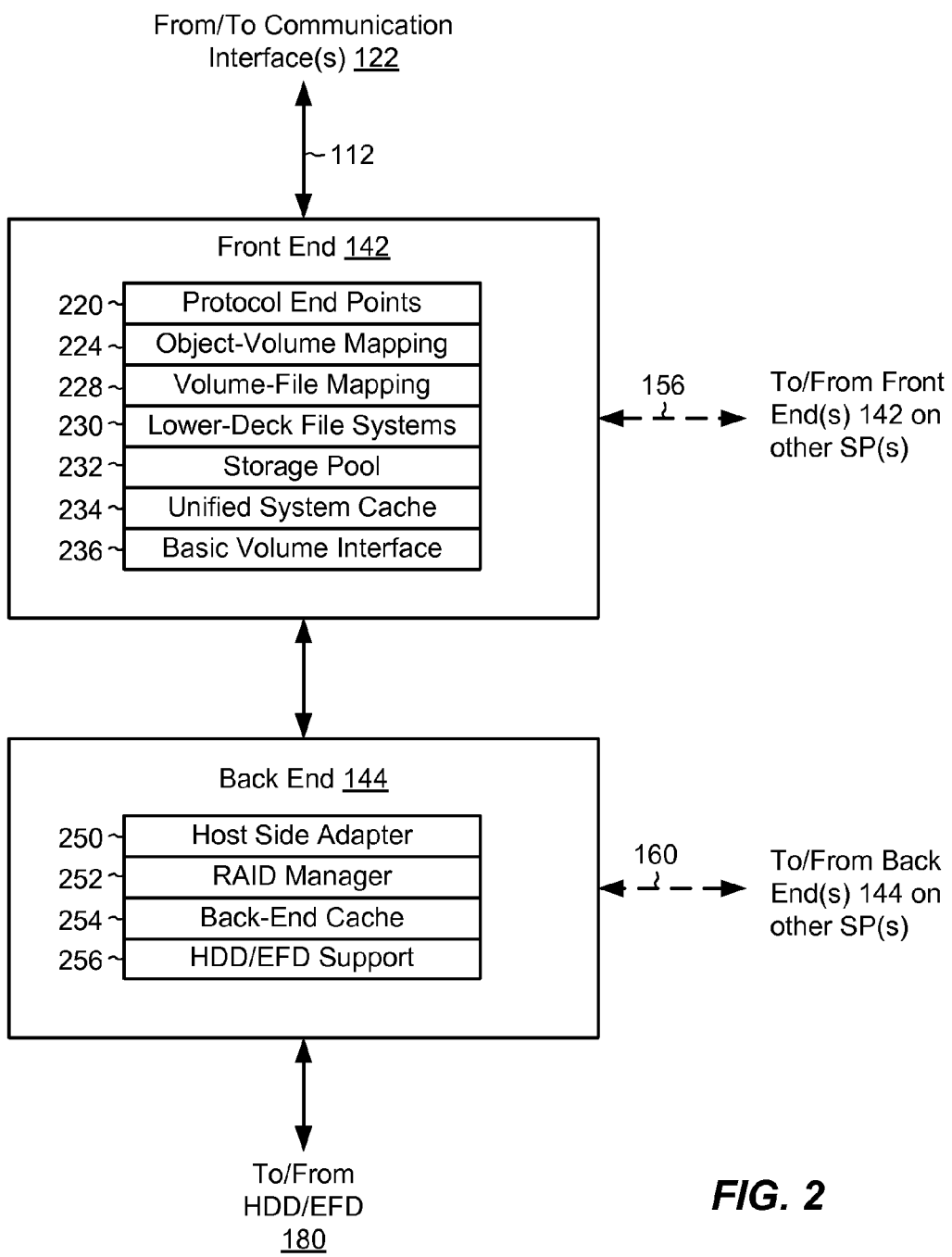
FIG. 2 is a block diagram showing an example IO stack, which may be provided on each of the storage processors shown in FIG. 1.

FIG. 2 shows an example front end 142 and back end 144 of the IO stack 140 in additional detail. Here, the front end 142 is seen to include protocol end points 220, object-volume mapping 224, volume-file mapping 228, lower-deck (internal) file systems 230, a storage pool 232, a unified system cache 234, and a basic volume interface 236. The back end 144 is seen to include a host side adapter 250, a RAID manager 252, a back-end cache 254, and hard disk drive/electronic flash drive support 256.

At the back end 144, the hard disk drive/electronic flash drive support 256 includes drivers that perform the actual reading from and writing to the storage 180. The back-end cache 254 performs block-level caching of data of IO requests 112. The RAID manager 252 accesses particular storage units (e.g., slices) written or read using RAID protocols. The host side adapter 250 provides an interface to the front end 142, for instances in which the front end 142 and back end 144 are run on different machines or in different containers. When the front end 142 and back end 144 are co-located on the same SP, as they are in FIG. 1, the host side adapter 250 may be omitted or made to perform no operation.

The above-described features of the back end 144 are configured to support active-active access for reading from and writing to data objects stored in the storage 180 from multiple SPs. For example, the RAID manager 252 and back-end cache 254 on each SP are constructed and arranged to maintain consistency with the RAID manager 252 and back end-cache 254 on the other SP (or on multiple other SPs, in some arrangements). The back end 144 on each of the SPs communicates with the back end 144 of one or more other SPs (e.g., over logical connection 160) to provide consistent metadata and to provide coordinated mirroring, locking, serializing, and/or other access control features, to ensure that each back end 144 participating in the active-active arrangement has a consistent view the RAID groups, FLUs, and back-end cache 254 of the data storage system 116.

Continuing to the front end 142, the basic volume interface 236 provides an interface to the back end 144 for instances in which the front end 142 and the back end 144 are run on different hardware or in different containers. The basic volume interface 236 may be inactive when the front end 142 and the back end 144 are co-located, as in the arrangement shown in FIG. 1.

The unified system cache 234 provides caching services for data stored in the lower-deck file systems 230. In some examples, the unified system cache 234 directs data specified by host writes to local RAM or flash memory and thus avoids the need to access the storage 180, which is typically more remote than local RAM or flash memory and takes more time to access. In some examples, the unified system cache 234 also directs data returned in response to read IO requests to be stored in local RAM or flash memory for fast access in the event that subsequent host IO requests require the same data. In some examples, local RAM or flash memory may store the only valid copy of host data, with writes to the storage 180 being deferred and, in cases where host data needs to be stored only transiently, avoided altogether.

The storage pool 232 organizes units of storage in the form of slices. A "slice" is a unit of storage space, such as 256 MB or 1 GB in size, which is derived from the storage 180. The pool 232 may allocate slices to lower-deck file systems 230 for use in storing their files. The pool 232 may also deallocate slices from lower-deck file systems 230 if storage provided by previously allocated slices is no longer required. In an example, the storage pool 232 creates slices by accessing RAID groups formed by the RAID manager 252, dividing the RAID groups into FLUs (Flare LUNs), and further dividing the FLUs to form the slices.

The lower-deck, or "internal" file systems 230 are built upon slices managed by a storage pool 232 and represent both block-based objects and file-based objects internally in the form of files of the file systems 230. The data storage system 116 may host any number of lower-deck file systems 230, and each lower-deck file system may include any number of files. In a typical arrangement, a different lower-deck file system is provided for each data object to be stored. Each lower-deck file system includes one file that stores the data object itself and in some instances includes other files that store snaps of the file that stores the data object. Each lower-deck file system 230 has an inode table. The inode table provides a different inode for each file stored in the respective lower-deck file system. The inode table may also store properties of the file(s), such as their ownership and block locations at which the file's/files' data are stored.

The volume-file mapping 228 maps each file representing a data object to a respective volume, which is accessible using block-based semantics. The volume-file mapping can be achieved in a variety of ways. According to one example, a file representing a data object is regarded as a range of blocks (e.g., 8K allocation units), and the range of blocks can be expressed as a corresponding range of offsets into the file. Because volumes are accessed based on starting location (logical unit number) and offsets in the volume, the volume-file mapping 228 can establish a one-to-one correspondence between offsets into the file and offsets into the corresponding internal volume, thereby providing the requisite mapping needed to express the file in the form of a volume.

The object-volume mapping layer 224 maps internal volumes to respective data objects, such as LUNs, host file systems, and vVOLs, for example. Mapping underlying volumes to host-accessible LUNs may simply involve a remapping operation from a format compatible with the internal volume to a format compatible with the LUN. Mapping internal volumes to host file systems, however, may be accomplished in part by leveraging from the fact that file systems are customarily built upon volumes, such that an underlying volume is part of the structure of a host file system. Host file systems, also called "upper-deck file systems," are thus built upon the internal volumes presented by the volume-file mapping 228 to provide hosts with access to files and directories. Mapping of vVOLs can be achieved in similar ways. For block-based vVOLs, the object-volume mapping layer 224 may perform mapping substantially as it does for LUNs. File-based vVOLs may be mapped, for example, by converting host-specified offsets into vVOL files to corresponding offsets into internal volumes.

The protocol end points 220 expose the underlying data objects to hosts in accordance with respective protocols for accessing the data objects. Thus, the protocol end points 220 may expose block-based objects (e.g., LUNs and block-based vVOLs) using Fiber Channel or iSCSI and may expose file-based objects (e.g., host file systems, file-based vVOLs, and VMDKs) using NFS, CIFS, or SMB 3.0, for example.

Figure 3:
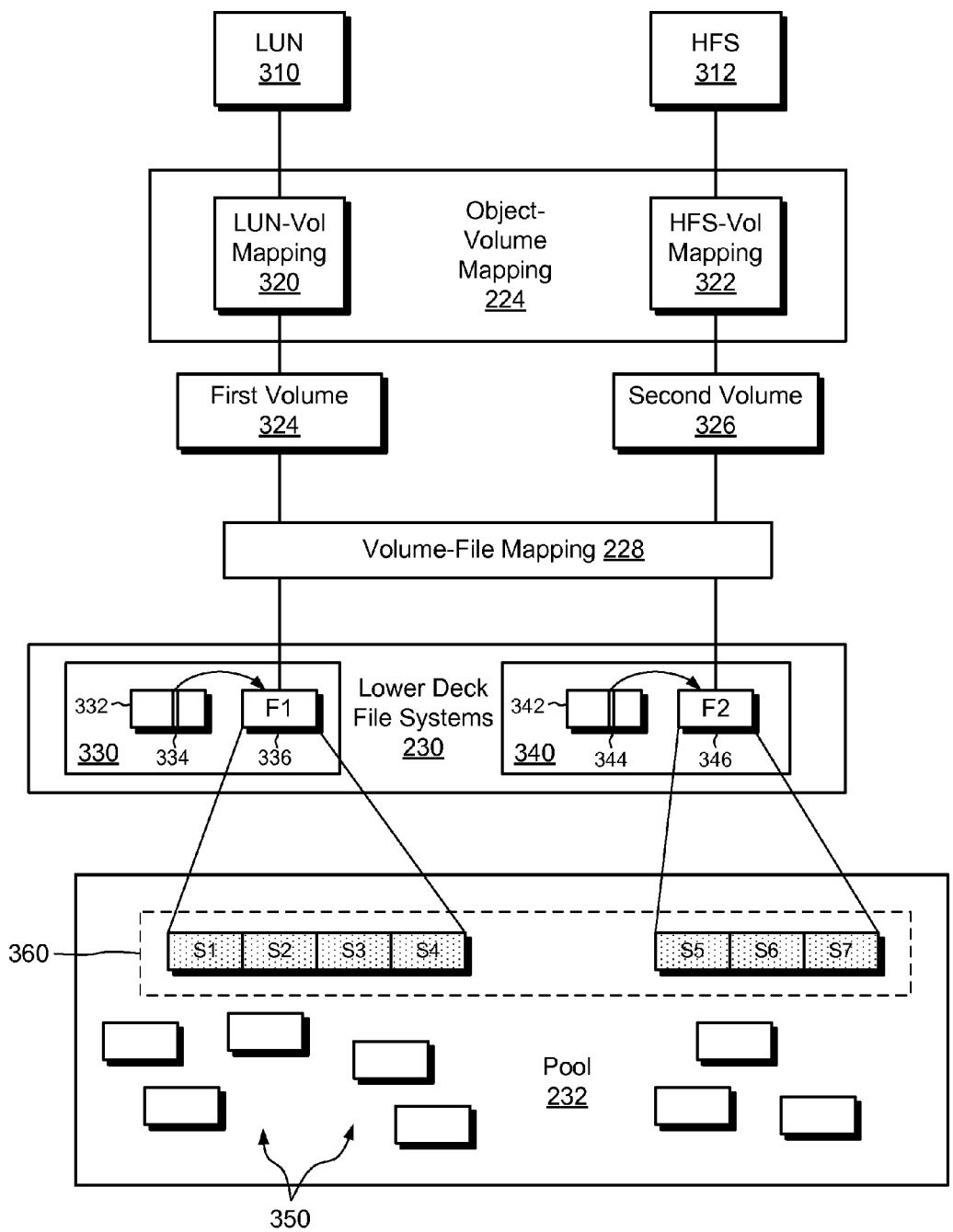
FIG. 3 is a block diagram showing example features of the IO stack of FIG. 2 in greater detail.

FIG. 3 shows portions of the front end 142 in additional detail. Here, data objects include a LUN 310 and an HFS (host file system) 312. The object-volume mapping 224 includes a LUN-to-Volume mapping 320 and an HFS-to-Volume mapping 322. The LUN-to-Volume mapping 320 maps the LUN 310 to a first volume 324, and the HFS-to-Volume mapping 322 maps the HFS 312 to a second volume 326. The Volume-to-File mapping 228 maps the first and second internal volumes 324 and 328 to respective files 336 (F1) and 346 (F2) in respective lower-deck files systems 330 and 340. Through the various mappings, any set of blocks of the LUN 310 specified in an IO request 112 is mapped to a corresponding set of blocks within the first file 336. Similarly, any file or directory of the HFS 312 specified in an IO request 112 is mapped to a corresponding set of blocks within the second file 346. It is understood that the files 336 and 346 may be quite large to accommodate the sizes of the data objects they store.

The lower-deck file system 330 includes an inode table 332, and the lower-deck file system 340 includes an inode table 342. An inode 334 provides file-specific information about the first file 336, and an inode 344 provides file-specific information about the second file 346. The information stored in each inode includes location information (e.g., block locations) where data of the respective file are stored.

As shown, the storage pool 232 allocates slices 360 for providing storage for the first file 336 and for the second file 346. Here, slices S1 through S4 store the data of the first file 336, and slices S5 through S7 store the data of the second file 346. The data that make up the LUN 310 are thus stored in the slices S1 through S4, whereas the data that make up the HFS 312 are stored in the slices S5 through S7. In some examples, the storage pool 232 causes free slices 350 to become allocated slices 360, e.g., in response to additional storage demands in file F1 or F2. Likewise, the storage pool 232 may cause allocated slices 360 to become free slices 350, e.g., in response to a reduction in the size of file F1 or F2.

The above-described features of the front end 142 are configured to support active-active access for reading from and writing to data objects by multiple SPs. For example, the front end 142 on each of the SPs communicates with one or more other front ends 142 (e.g., over the logical connection 156) to maintain consistency across unified system caches 234, storage pools 232, and lower-deck file systems 230 (see also FIG. 2). In an example, the unified system cache 234 on each SP communicates with the unified system cache 234 on one or more other SPs to maintain cache coherency. Also, the storage pool 232 operates in a clustered manner with the storage pool 232 running on each of one or more other SPs to maintain a consistent view of slice allocation and metadata across all of such SPs, such that changes in a storage pool 232 on one SP are reflected in the storage pool 232 on each of the other such SPs. Further, the lower-deck file systems 230 operate in a clustered manner across multiple SPs to provide a consistent file system image having a single namespace for each lower-deck file system accessed in active-active mode.

In some examples, the object-volume mapping 224 also operates in a clustered arrangement. For example, if a data object being accessed in active-active mode is a host file system, then the object-volume mapping 224 provides not only mapping to an underlying volume (and file) but also the features needed by hosts to access and use the host file system. To support active-active access to the host file system from multiple SPs, the object-volume mapping 224 further provides file system clustering. Such file system clustering presents a consistent view of the host file system to hosts, regardless of which SP is used to access the host file system. It should be noted that clustering described above for lower-deck file systems is not enough to support active-active access to host file systems. Clustering lower-deck file system supporting host file systems promotes consistency among different SPs at the internal file system level but does not address the need for consistency at the upper deck. Rather, the upper-deck, host file system should itself also be clustered to provide hosts with a single image of the host file system having a single namespace that is consistent across all SPs. To effect clustering of upper-deck file systems, the object-volume mapping 224 on the front end 142 of each SP accessing the host file system in active-active mode communicates (e.g., over the logical connection 156) with each of the other such SPs to provide coordinated mirroring, locking, serializing, and/or other access control features to ensure consistency across all such SPs.

As described hereinabove, two SPs 120a and 120b are configured to provide active-active access to data objects (e.g., LUN 1 and HFS 1) hosted from an IO stack 140 that realizes both block-based objects and file-based objects as underlying files (e.g., 336 and 346) in a set of internal (lower-deck) file systems 230. However, the number of SPs that participate in an active-active arrangement need not be limited to two and can be extended with the addition of more storage processors to the data storage system 116.

Figure 4:
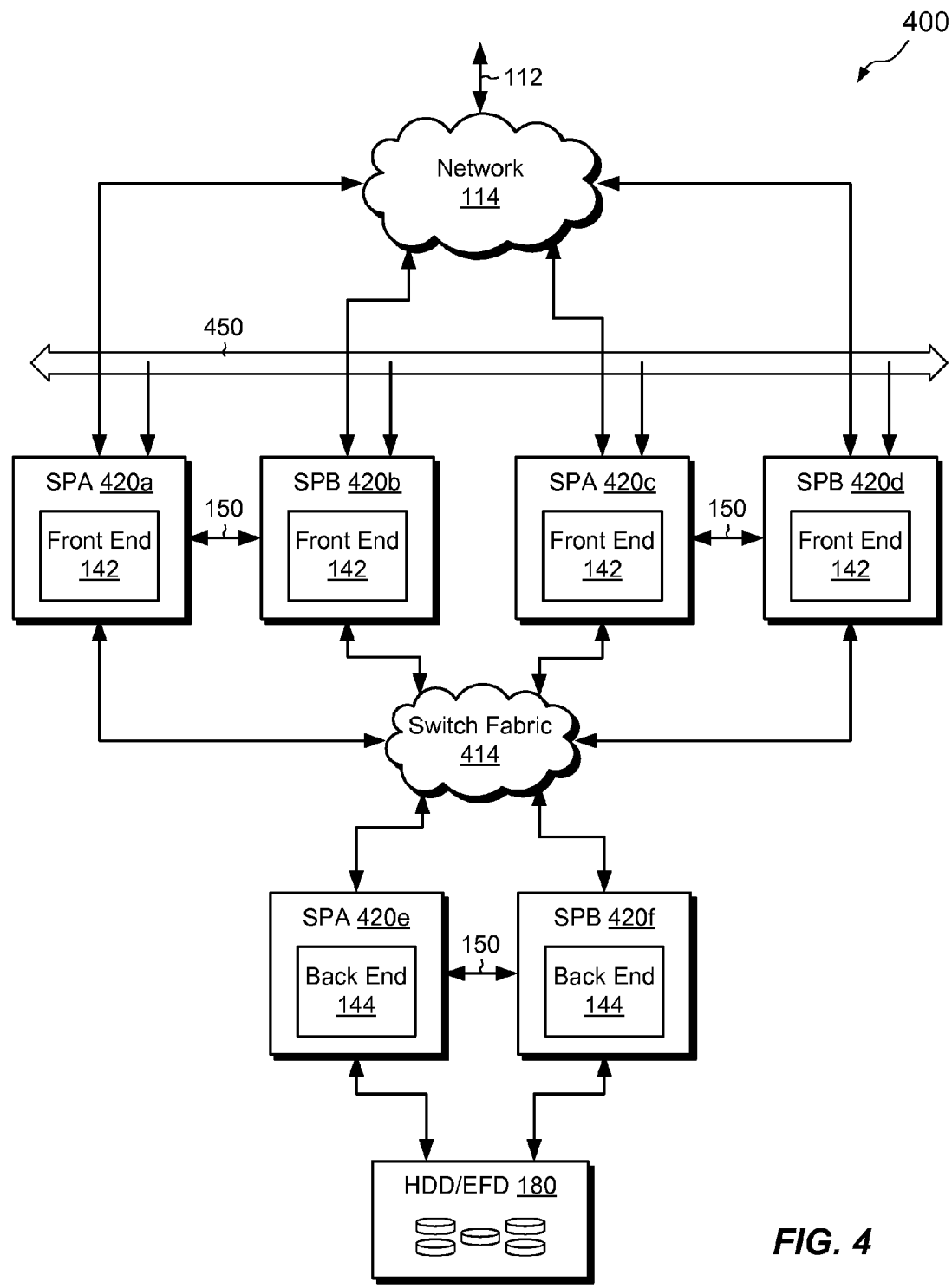
FIG. 4 is a block diagram showing a data storage system in which greater than two storage processors operate in an active-active arrangement.

FIG. 4 shows an example arrangement 400 for providing active-active access to a data object in storage 180 using six SPs. Here, four of the SPs (420a through 420d) run IO stack front ends 142 (with no back ends 144) and two of the SPs (420e and 420f) run IO stack back ends 144 (with no front ends 142). The SPs 420a through 420f may otherwise be configured in a manner similar to the SPs 120a and 120b shown in FIG. 1. The SPs 420a and 420b form a functional pair connected via a high-speed interconnect 150. Functional pairs of SPs are also formed between SPs 420c and 420d, and between SPs 420e and 420f, with an interconnect 150 provided between the SPs of each pair. A high speed network 450, such as InifinBand, is used to interconnect front end SPs 420a through 420d that belong to different pairs. The SPs 420a through 420d running front ends 142 are also connected to the SPs 420e and 420f via a switch fabric 414, which allows any of the SPs 420a, 420b, 420c, and 420d (i.e., any of the "front-end SPs") to be selectively connected to any of the SPs 420e and 420f (i.e., any of the "back-end SPs").

In operation, the front-end SPs 420a-420d receive IO requests 112 specifying data to be written to and/or read from a particular data object. The front ends 142 running on the SPs 420a-420d perform front-end processing in response to receiving the IO requests 112. The front-end processing includes performing clustering activities, such as coordinating among the unified system caches 234 of the SPs 420a-420d to maintain cache coherency, coordinating among the storage pools 232 to maintain a single, consistent view of slice allocation, coordinating among the lower-deck file systems 230 hosting the data object to provide a single file system image having a single namespace shared among the SPs 120a-120d, and (when the object is a host file system) coordinating among the object-volume mapping 224 to provide a single host file system image (at the upper deck) having a single namespace shared among the SPs 420a-420d. Such coordination among front-end SPs 420a-420d takes place over the logical connection 156 using physical interconnects 150 for SPs in the same pair and/or using the high-speed network 450 for SPs in different pairs. Once the front end SPs 120a-120d have processed the IO requests 112, the front end SPs 420a-420d transmit modified versions of the IO requests to the back-end SPs 420e and 420f through the switch fabric 414 in a block-based protocol, such as Fibre Channel or iSCSI.

The back-end SPs 420e and 420f receive the block-based versions of the IO requests from the front-end SPs and further process the requests to effect read and/or write operations on the data object in the storage 180. Such processing includes coordinating between the RAID manager 252 on SP 420e and the RAID manager 252 on SP 420f to ensure that both back-end SPs 420e and 420f maintain the same view of RAID groups and FLUs. Such processing also includes coordinating between the back-end cache 254 on SP 420e and the back-end cache 254 on SP 420f to maintain cache coherency across both back-end SPs 420e and 420f.

With the arrangement of FIG. 4, any of the front end SPs 420a-420d can process IO requests 112 directed to a data object, without some SPs needing to forward IO requests to other SPs, as is needed in active-passive arrangements. Rather, the SPs 420a-420d can process IO requests 112 in parallel. Once a front-end SP processes an IO request, the front-end SP can direct the switch fabric 414 to switch the resulting modified IO request to any of the back-end SPs, for further processing and writing to the storage 180. As with the front-end SPs 420a-420d, the back-end SPs 420e and 420f can also process IO requests in parallel.

Although the arrangement of FIG. 4 is shown with four front-end SPs 420a-420d and two back-end SPs 420e and 420f, it is understood that the number of SPs provided in the front end and in the back end can vary depending on expected load and other considerations. In an example, additional front-end SPs are added to the arrangement 400. Such additional SPs connect to the currently-shown front-end SPs, e.g., over the high-speed network 450, for maintaining consistency among front ends 144. The additional SPs also connect to the switch fabric 414 for sending block-based versions of IO request to the back-end SPs. The number of back-end SPs can also be increased. For example, additional SP pairs running back ends 144 can be added, with added SP pairs connecting to the currently-shown back-end SPs over a high-speed network, e.g., similar to the network 450.

In another arrangement (not shown), multiple front-end SPs can be connected to a back-end array, such as a VMAX array, in a gateway arrangement, where the back-end array includes one or more internal back ends like the back end 144. In an example, the front-end SPs operate as described above in connection with the front-end SPs of FIG. 4. If the back-end array operates a single back end, then no coordination is needed among different back-ends. Rather, the back-end running on the array may serialize and process arriving block-based versions of IO requests in the order received. If the back-end array operates multiple back ends, then coordination among such back ends 144 within the array may proceed as described above in connection with multiple back-end SPs.

It should be understood that the arrangement of FIG. 4 (as well as that described in connection with FIG. 1), can process IO requests 112 for different data objects, and that such IO requests can be processed at the same time. For example, the arrangements shown in FIGS. 1 and 4 can each receive a first set of IO requests directed to a pooled LUN (e.g., LUN 1 of FIG. 3) and a second set of IO requests directed to a host file system (e.g., HFS 1 of FIG. 3). Further, other sets of IO requests can be directed to block-based vVOLs, file-based vVOLs, VMDKs, VHDs, and so forth. Different data objects are mapped to different lower-deck files (and usually to different lower-deck file systems 230). The front ends 142 of all SPs that provide front-end active-active processing coordinate with one another to maintain consistency in front-end operations, and the back ends 144 of all SPs that provide back-end active-active processing coordinate with one another to maintain consistency in back-end operations. Thus, the SPs in any of the arrangements above can provide active-active access to multiple data objects at the same time.

Section II: Example Extension of Active-Active Access by Multiple Storage Processors Over Distance in a Metro-Cluster.

Examples will now be described in which active-active access to data objects is achieved by storage processors operating in different data storage systems separated by distance in a metro-cluster.

In the examples described herein, providing access to data objects in a metro-cluster is facilitated by embedding a data federation module (DFM) within the IO stack 140 of each SP of the metro-cluster and coordinating among the DFMs to provide a consistent view of storage and cache across all SPs. In an example, the DFMs perform a role similar to that of external data federation equipment, such as that currently provided in VPLEX systems, which are available from EMC Corporation of Hopkinton, Mass. That role includes: (1) providing LUN virtualization such that any locally-attached LUN of any SP in a metro-cluster can appear as a local LUN to all SPs in the metro-cluster, regardless of the physical location of the SPs within the metro-cluster; (2) providing cache coherency across all SPs in the metro-cluster, such that all SPs have a consistent view of data caching for the virtualized LUNs; and (3) providing data mirroring over distance, such that data writes to any attached LUN on any SP in the metro-cluster may be mirrored across distance to attached storage on any other SP in the metro-cluster to maintain a replica at a remote site and thereby to promote fast failover in the event of a local site failure.

Figure 5:
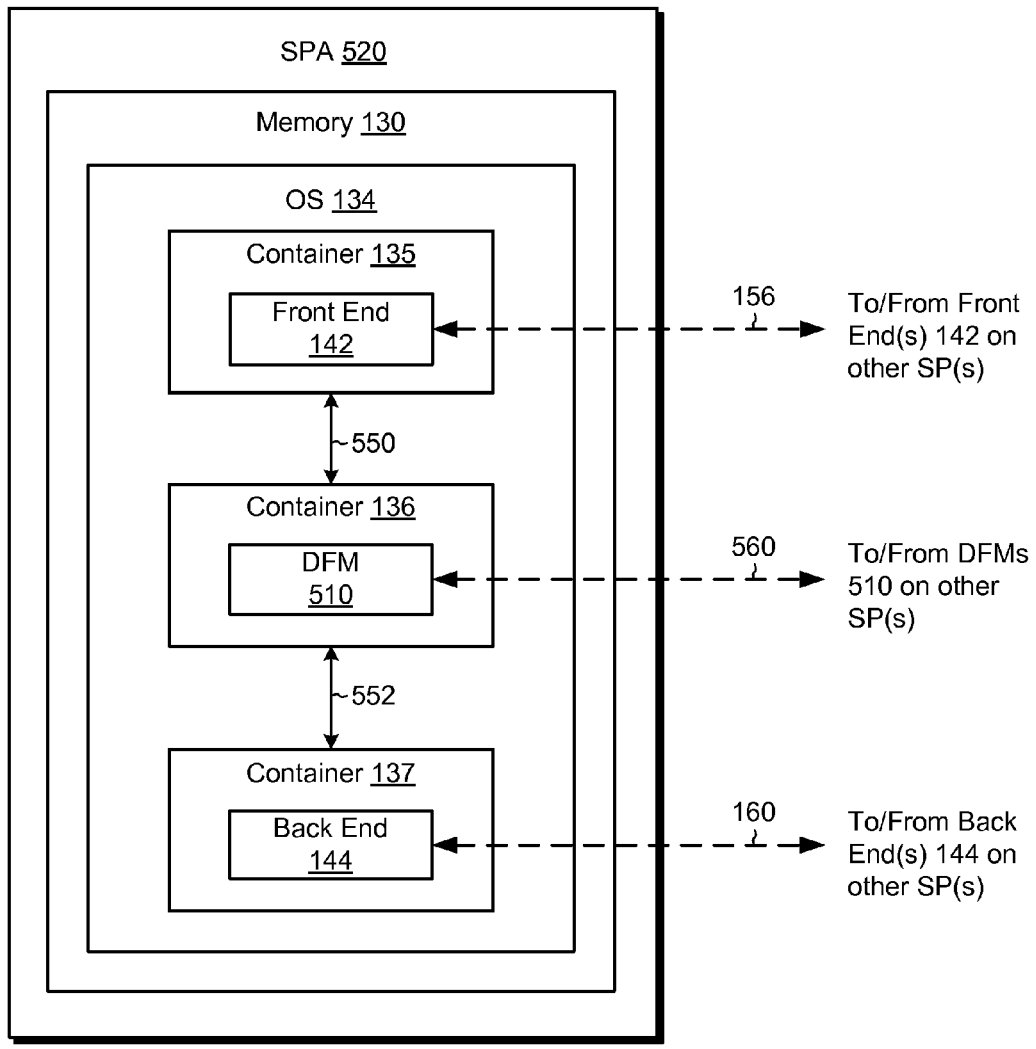
FIG. 5 is a block diagram of an example storage processor configured for active-active operation in a metro-cluster and including a data federation manager.

FIG. 5 shows an example SP configuration, which may be common to all SPs provided in a metro-cluster. Here, an SP 520 runs three containers 135, 136, and 137 within operating system 134. A first container 135 runs the IO stack front end 142, a second container 136 runs a DFM 510, and a third container 137 runs the IO stack back end 144. In an example, the containers 135, 136, and 137 are similar to the container 132 described in connection with FIG. 1, i.e., each of the containers 135, 136, and 137 provides an isolated user space instance. The front end 142 running in container 135 communicates with the DFM 510 running in container 136 over logical path 550 using IPC. Similarly, the DFM 510 running in container 136 communicates with the back end 144 running in container 137 over logical path 552 using IPC.

In its location within the IO stack 140 between the front end 142 and the back end 144, the DFM 510 is well positioned to virtualize LUNs from locally attached storage and to serve such virtualized LUNs to the storage pool 232 (FIGS. 2 and 3) in the front end 142 to provide sources of storage slices 350/360. The storage pool 232 then uses the slices 350/360 in composing lower-deck file systems 230 and thus in composing the data objects stored as files in the lower-deck file systems 230. The virtualized LUNs described in connection with this Section II thus perform a similar role to that described for the FLUs above in connection with Section I.

The front end 142 of the SP 520 communicates with front ends 142 on other SPs in the metro-cluster via logical connection 156, i.e., to maintain consistency among storage pools 232 and internal file systems 230 operating on the different SPs, in a similar way to that described in Section I. In an example, however, the unified system cache 234 (FIG. 2) is operated in a non-clustered, write-through mode, with caching and cache coherency operations managed instead by the DFM 510. To maintain consistency across SPs, the DFM 510 communicates over logical path 560 with DFMs 510 on other SPs.

The back end 144 of the SP 520 communicates with back ends 144 on other SPs in the metro-cluster via logical connection 160, i.e., to maintain consistency among RAID managers 252 and back-end caches 254 on other SPs in the metro-cluster. In an example, the back-end cache 254 on each SP in the metro-cluster is operated in write-back mode.

It should be understood that the configuration of the SP 520 may be similar to that of the SPs 120a and SP 120b described above, except for the differences indicated above.

Figure 6:
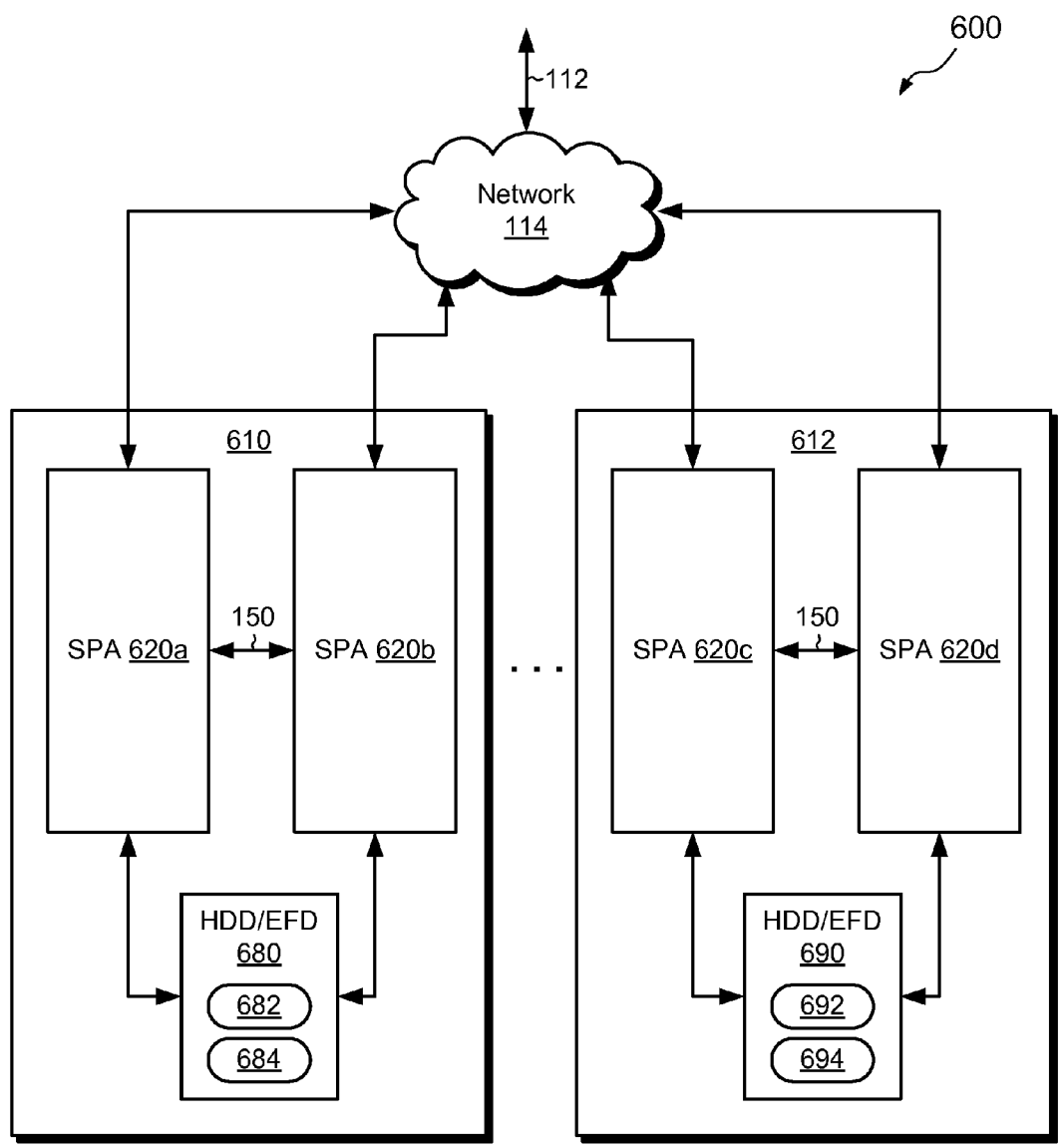
FIG. 6 is a block diagram of an example arrangement of storage processors for providing active-active operation in a metro-cluster over distance.

FIG. 6 shows an example metro-cluster 600 in which active-active access to data objects can be achieved. Here, SP 620a and SP 620b reside in a first data storage system 610, and SP 620c and SP 620d reside in a second data storage system 612, which may be located remotely from the first data storage system 610, e.g., in another room, building, or other location within a designated distance, such as 100 km, for example. The SPs 620a through 620d may be configured in the same manner shown for the SP 520 of FIG. 5.

In an example, the SPs 620a and 620b form one SP pair and are connected together via a high-speed interconnect 150. Similarly, the SPs 620c and 620d form another SP pair and are connected together via another high-speed interconnect 150. Additional SP pairs (not shown) may be provided in each of the data storage systems 610 and 612 as part of the metro-cluster 600 (e.g., connected to other SP pairs in the respective data storage system over a high-speed network 450—see FIG. 4), and additional data storage systems (not shown) may further be provided in the metro-cluster 600. The data storage systems 610 and 612 are interconnected via network 114, or via some other network. Such interconnects 150, high-speed networks 450, and network 114 provide physical means for conveying logical connections 156, 160, and 560 among the storage processors of the data storage systems in the metro-cluster 600.

As also seen in FIG. 6, attached storage 680 is connected to the SPs 620a and 620b of the data storage system 610 using, for example, Fibre Channel or iSCSI. Attached storage 690 is connected to the SPs 620c and 620d of the data storage system 612 in a similar manner. The SPs 620a and 620b realize LUNs 682 and 684 from the storage 680, and the SPs 620c and 620d realize LUNs 692 and 694 from the storage 690. Although the LUNs 682, 684, 692, and 694 are each local to the respective data storage systems 610 and 612, the DFMs 510 running within each of the SPs 620a through 620d virtualize the LUNs 682, 684, 692, and 694 across the metro-cluster 600 such that all of the LUNs 682, 684, 692, and 694 appear as local LUNs to the front ends 142 of all of the SPs 620a through 620d.

In operation, the DFMs 510 running on the SPs 620a through 620d operate in a coordinated fashion to virtualize the LUNs 682, 684, 692, and 694 across the metro-cluster 600 and to provide cache coherency among the SPs 620a through 620*d*. The storage pools 232 (FIGS. 2 and 3) running on the front ends 142 of the SPs 620*a* through 620*d* operate in a clustered fashion to provide a consistent view of storage unit allocation across the SPs 620*a* through 620*d* of the metro-cluster 600. Likewise, the lower-deck file systems 230 running on the front ends 142 of the SPs 620*a* through 620*d* each operate in a clustered fashion to provide a single file system image having a single namespace across the SPs 620*a* through 620*d* of the metro-cluster 600. Using techniques similar to those described in Section I, the SPs 620*a* through 620*d* provide read and write access to both block-based objects and file-based objects, where all such objects are realized in the form of files stored in internal, lower-deck file systems 230.

Active-active access to data objects can then proceed in response to multiple SPs of the metro-cluster 600 receiving IO requests. For example, SP 620*a* and SP 620*d* may each receive a block-based IO request directing the respective SP to write data to a particular LUN. Rather than one SP having to forward the IO request to the other SP (or to some third SP), as would be required in an active-passive arrangement, here each of the SPs 620*a* and 620*d* processes the IO request it receives independently and without the need for forwarding. As each SP perform its respective write operation independently of the others, the front ends 142, back ends 144, and DFMs 510 maintain consistency between the SPs 620*a* and 620*d* and, more generally, among all SPs in the metro-cluster 600. It should be understood that any number of the SPs 620*a* through 620*d* can process IO requests directed to the same data object in parallel and at the same time, that the IO requests can specify reads or writes, and that the IO requests may be directed to block-based objects or to file-based objects.

As another example, assume that each of the SPs 620*a* through 620*d* receives a file-based IO request specifying data to be read from a particular file of a particular host file system. Rather than engaging in some inefficient forwarding scheme, each of the SPs 620*a* through 620*d* independently processes the respective read operation on the file, with the front ends 142, back ends 144, and DFMs 510 maintaining consistency among the SPs 620*a* through 620*d* of the metro-cluster 600.

Figure 7:
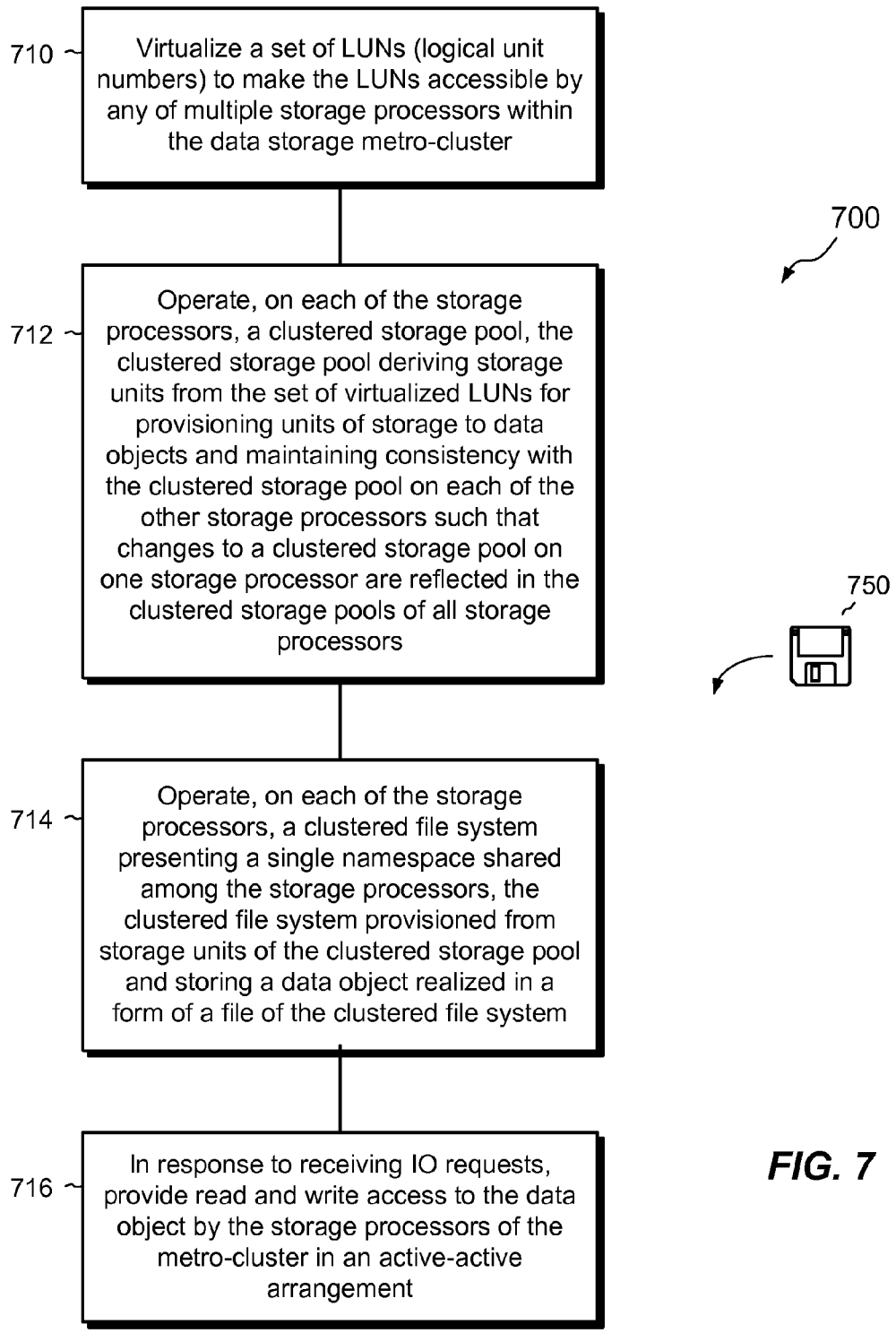
FIG. 7 is a flowchart showing an example method of processing IO requests in a data storage metro-cluster, such as that shown, for example, in FIG. 6.

FIG. 7 shows an example process 700 for processing IO requests in a data storage metro-cluster. In an example, the process 700 is performed by the SPs 620*a* through 620*d*, using the software constructs described in connection with FIGS. 1-3 and 5.

At step 710, a set of LUNs (logical unit numbers) are virtualized to make the LUNs accessible by any of multiple storage processors within the data storage metro-cluster. For example the DFMs 510 running on the SPs 620*a* through 620*d* virtualize the LUNs 682, 684, 692, and 694 to make the LUNs accessible by any of the SPs 620*a* through 620*d* in the metro-cluster 600.

At step 712, a clustered storage pool is operated on each of the storage processors. The clustered storage pool derives storage units from the set of virtualized LUNs for provisioning to data objects and maintains consistency with the clustered storage pool on each of the other storage processors such that changes to a clustered storage pool on one storage processor are reflected in the clustered storage pools of all storage processors. For example, a storage pool 232 (FIGS. 2 and 3) is operated in a clustered manner on each of SPs 620*a* through 620*d*. The storage pool 232 derives storage units (e.g., slices 350/360) from the virtualized LUNs 682, 684, 692, and 694 for provisioning to data objects (e.g., pooled LUN 310 and/or HFS 312) and maintains consistency with the storage pool 232 on each of the other SPs, e.g., via logical path 156.

At step 714, a clustered file system is operated on each of the storage processors. The clustered file system presents a single namespace shared among the storage processors. The clustered file system is provisioned from storage units of the clustered storage pool and stores a data object realized in a form of a file of the clustered file system. For example, a lower-deck file system 230 is operated in a clustered manner on each of the storage processors 620*a* through 620*d* and presents a single namespace shared among all of the SPs 620*a* through 620*d*. The lower-deck file system 230 is provisioned from storage slices 360 of the storage pool 232 and stores a data object (e.g., a pooled LUN 310 or HFS 312) in the form of a file (e.g., 336 or 346).

At step 716, in response to receiving IO requests, read and write access to the data object is provided by the storage processors of the metro-cluster in an active-active arrangement. For example, multiple SPs 620*a* through 620*d* receive IO requests 112 and each process the IO requests without forwarding to perform read and write operations on the data object, (e.g., LUN 310, HFS 312, or some other data object).

An improved technique has been described that provides active-active access to pooled block-based objects and pooled file-based objects by multiple storage processors 620*a* through 620*d* over distance in a metro-cluster 600. The storage processors in the metro-cluster 600 virtualize locally attached LUNs (e.g., 682, 684, 692, 694) and make the virtualized LUNs available to all the storage processors in the metro-cluster 600. A storage pool 232 runs on each of the storage processors and provisions storage units (e.g., slices 350/360) derived from the virtualized LUNs for use in composing data objects (e.g., pooled LUN 310 and HFS 312). On each storage processor, data objects are realized in the form of respective files (e.g., 336, 346) stored in a set of internal file systems 230, which are built upon volumes (e.g., 324, 326) composed from storage units from the storage pool 232. To provide active-active access to a data object, the internal file system 230 for that data object on each of the storage processors is clustered and made to coordinate with the internal file system for that object on each of the other storage processors to present a consistent file system image having a single namespace across all storage processors. In a similar manner, the storage pool 232 on each of the storage processors is clustered and coordinates with a storage pool 232 on each of the other storage processors to present a consistent image of storage unit allocation across all storage processors. The resulting arrangement allows each storage processor in the metro-cluster to access both block-based data objects and file-based data objects in an active-active manner, while maintaining consistency across all storage processors and allowing customers to benefit from the advantages of pooled data objects.

As used throughout this document, the words "comprising," "including," and "having" are intended to set forth certain items, steps, elements, or aspects of something in an open-ended fashion. Although certain embodiments are disclosed herein, it is understood that these are provided by way of example only and the invention is not limited to these particular embodiments. In addition, the word "set" as used herein indicates one or more of something, unless a statement is made to the contrary.

Having described certain embodiments, numerous alternative embodiments or variations can be made. For example, the improvements or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like (shown by way of example as medium 750 in FIG. 7). Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

Further still, although features are shown and described with reference to particular embodiments hereof, such features may be included in any of the disclosed embodiments and their variants. Thus, it is understood that features disclosed in connection with any embodiment can be included as variants of any other embodiment, whether such inclusion is made explicit herein or not.

Those skilled in the art will therefore understand that various changes in form and detail may be made to the embodiments disclosed herein without departing from the scope of the invention.

What is claimed is:

1. A method of processing IO requests in a data storage metro-cluster, comprising:
    virtualizing a set of LUNs (logical unit numbers) to make the LUNs accessible by any of multiple storage processors within the data storage metro-cluster;
    operating, on each of the storage processors, a clustered storage pool, the clustered storage pool deriving storage units from the set of virtualized LUNs for provisioning to data objects and maintaining consistency with the clustered storage pool on each of the other storage processors such that changes to a clustered storage pool on one storage processor are reflected in the clustered storage pools of all storage processors;
    operating, on each of the storage processors, a clustered file system presenting a single namespace shared among the storage processors, the clustered file system provisioned from storage units of the clustered storage pool and storing a data object realized in a form of a file of the clustered file system; and
    in response to receiving IO requests, providing read and write access to the data object by the storage processors of the metro-cluster in an active-active arrangement,
    wherein the multiple storage processors include a first storage processor at a first location and a second storage processor at a second location, the second location being remote from the first location, wherein maintaining consistency with the clustered storage pool on each of the other storage processors includes mirroring data over distance from the first storage processor at the first location to the second storage processor at the second location, and wherein virtualizing the set of LUNs causes a locally-attached LUN of the first storage processor at the first location to appear as a local LUN of the second storage processor at the second location.

2. A method as in claim 1, wherein the data object is one of (i) a LUN (Logical Unit Number), (ii) a host file system, and a (iii) vVOL (Virtual Volume), realized in the form of the file of the clustered file system.

3. A method as in claim 2, further comprising maintaining cache coherency among data caching of data specified in IO requests received by the storage processors on each of the storage processors of the data storage metro-cluster.

4. A method as in claim 3, wherein, for each of the storage processors, (i) operating the clustered pool and operating the clustered file system are performed in a first container running on the storage processor, and (ii) wherein virtualizing the LUNs and maintaining cache coherency are performed in a second container running on the storage processor, wherein operations in the first container communicate with operations in the second container using IPC (Inter Process Communication).

5. A method as in claim 4, further comprising, for each of the storage processors, performing write-through caching operations in the first container running on the storage processor.

6. A method as in claim 5, further comprising, for each of the storage processors, running an IO stack backend in a third container running on the storage processor, the IO stack backend performing write-back caching of data specified in IO requests received by the storage processor, wherein operations in the third container communicate with operations in the second container using IPC.

7. A method as in claim 2, wherein the data object is a LUN, and wherein the method further comprises:
    receiving, at a first storage processor of the storage processors of the metro-cluster, a first IO request in a block-based protocol specifying first data to be written to the LUN;
    receiving, at a second storage processor of the storage processors of the metro-cluster, a second IO request in the block-based protocol specifying second data to be written to the LUN;
    in response to receiving the first IO request, the first storage processor (i) locating the file in the clustered file system where the LUN is stored and (ii) directing a write operation to write the data specified in the first IO request to the file in the clustered file system; and
    in response to receiving the second IO request, the second storage processor (i) locating the file in the clustered file system where the LUN is stored and (ii) directing a write operation to write the data specified in the second IO request to the file in the clustered file system.

8. A method as in claim 2, wherein the data object is a host file system, and wherein the method further comprises operating the host file system in a clustered arrangement such that the host file system presents a single namespace shared among the storage processors of the metro-cluster.

9. A method as in claim 8, wherein the method further comprises:
    receiving, at a first storage processor of the storage processors of the metro-cluster, a first IO request in a file-based protocol specifying first data to be written to the host file system;
    receiving, at a second storage processor of the storage processors of the metro-cluster, a second IO request in the file-based protocol specifying second data to be written to the host file system;
    in response to receiving the first IO request, the first storage processor (i) locating the file in the clustered file system where the host file system is stored and (ii) directing a write operation to write the data specified in the first IO request to the file in the clustered file system; and
    in response to receiving the second IO request, the second storage processor (i) locating the file in the clustered file system where the host file system is stored and (ii) directing a write operation to write the data specified in the second IO request to the file in the clustered file system.

10. A data storage metro-cluster comprising multiple storage processors connected together over a network, each of the storage processors including a set of processing units and memory, the memory coupled to the set of processing units and storing executable instructions, which when executed on the respective processing units cause the storage processors to:
  virtualize a set of LUNs (logical unit numbers) to make the LUNs accessible by any of multiple storage processors within the data storage metro-cluster;
  operate, on each of the storage processors, a clustered storage pool, the clustered storage pool constructed and arranged to (i) derive storage units from the set of virtualized LUNs, (ii) provision storage units to data objects and (iii) maintain consistency with the clustered storage pool on each of the other storage processors such that changes to a clustered storage pool on one storage processor are reflected in the clustered storage pools of all storage processors;
  operate, on each of the storage processors, a clustered file system presenting a single namespace shared among the storage processors, the clustered file system provisioned from storage units of the clustered storage pool and storing a data object realized in a form of a file of the clustered file system; and
  in response to receiving IO requests, provide read and write access to the data object by the storage processors of the metro-cluster in an active-active arrangement,
  wherein the multiple storage processors include a first storage processor at a first location and a second storage processor at a second location, the second location being remote from the first location, wherein the clustered storage pool constructed and arranged to maintain consistency with the clustered storage pool on each of the other storage processors is further constructed and arranged to mirror data over distance from the first storage processor at the first location to the second storage processor at the second location, and wherein virtualizing the set of LUNs is to cause a locally-attached LUN of the first storage processor at the first location to appear as a local LUN of the second storage processor at the second location.

11. A data storage metro-cluster as in claim 10, wherein the data object is one of (i) a LUN (Logical Unit Number), (ii) a host file system, and a (iii) vVOL (Virtual Volume), realized in the form of the file of the clustered file system.

12. A data storage metro-cluster as in claim 11, wherein the executable instructions further cause each of the storage processors to maintain cache coherency among data caching of data specified in IO requests received by the storage processors on each of the storage processors of the data storage metro-cluster.

13. A data storage metro-cluster as in claim 12, wherein the executable instructions further cause each of the storage processors to (i) operate the clustered pool and the clustered file system in a first container running on the respective storage processor, and (ii) virtualize the LUNs and maintain cache coherency in a second container running on the respective storage processor, wherein operations in the first container communicate with operations in the second container using IPC (Inter Process Communication).

14. A data storage metro-cluster as in claim 13, further comprising, for each of the storage processors, a write-through cache in the first container on the storage processor.

15. A data storage metro-cluster as in claim 14, further comprising, for each of the storage processors, an IO stack backend in a third container on the storage processor, the IO stack backend constructed and arranged to perform write-back caching of data specified in IO requests received by the storage processor, wherein the third container is constructed and arranged to communicate with the second container using IPC.

16. A computer program product having a non-transitory computer-readable medium including instructions which, when executed by control circuitry of a data storage system, cause the control circuitry to perform a method of processing IO requests in a data storage metro-cluster, the method comprising:
  virtualizing a set of LUNs (logical unit numbers) to make the LUNs accessible by any of multiple storage processors within the data storage metro-cluster;
  operating, on each of the storage processors, a clustered storage pool, the clustered storage pool (i) deriving storage units from the set of virtualized LUNs, (ii) provisioning units of storage to data objects and (iii) maintaining consistency with the clustered storage pool on each of the other storage processors such that changes to a clustered storage pool on one storage processor are reflected in the clustered storage pools of all storage processors;
  operating, on each of the storage processors, a clustered file system presenting a single namespace shared among the storage processors, the clustered file system provisioned from storage units of the clustered storage pool and storing a data object realized in a form of a file of the clustered file system; and
  in response to receiving IO requests, providing read and write access to the data object by the storage processors of the metro-cluster in an active-active arrangement,
  wherein the multiple storage processors include a first storage processor at a first location and a second storage processor at a second location, the second location being remote from the first location, wherein maintaining consistency with the clustered storage pool on each of the other storage processors includes mirroring data over distance from the first storage processor at the first location to the second storage processor at the second location, and wherein virtualizing the set of LUNs causes a locally-attached LUN of the first storage processor at the first location to appear as a local LUN of the second storage processor at the second location.

17. A computer program product as in claim 16, wherein the data object is one of (i) a LUN (Logical Unit Number), (ii) a host file system, and a (iii) vVOL (Virtual Volume), realized in the form of the file of the clustered file system.

18. A computer program product as in claim 17, wherein the data object is a LUN, and wherein the method further comprises:
  receiving, at a first storage processor of the storage processors of the metro-cluster, a first IO request in a block-based protocol specifying first data to be written to the LUN;
  receiving, at a second storage processor of the storage processors of the metro-cluster, a second IO request in the block-based protocol specifying second data to be written to the LUN;
  in response to receiving the first IO request, the first storage processor (i) locating the file in the clustered file system where the LUN is stored and (ii) directing a write operation to write the data specified in the first IO request to the file in the clustered file system; and
  in response to receiving the second IO request, the second storage processor (i) locating the file in the clustered file system where the LUN is stored and (ii) directing a write operation to write the data specified in the second IO request to the file in the clustered file system.

19. A computer program product as in claim 17, wherein the data object is a host file system, and wherein the method further comprises operating the host file system in a clustered arrangement such that the host file system presents a single namespace shared among the storage processors of the metro-cluster.

20. A method as in claim 19, wherein the method further comprises:
- receiving, at a first storage processor of the storage processors of the metro-cluster, a first IO request in a file-based protocol specifying first data to be written to the host file system;
- receiving, at a second storage processor of the storage processors of the metro-cluster, a second IO request in the file-based protocol specifying second data to be written to the host file system;
- in response to receiving the first IO request, the first storage processor (i) locating the file in the clustered file system where the host file system is stored and (ii) directing a write operation to write the data specified in the first IO request to the file in the clustered file system; and
- in response to receiving the second IO request, the second storage processor (i) locating the file in the clustered file system where the host file system is stored and (ii) directing a write operation to write the data specified in the second IO request to the file in the clustered file system.

* * * * *